(12) United States Patent
Ido

(10) Patent No.: US 6,236,784 B1
(45) Date of Patent: May 22, 2001

(54) Y BRANCHING OPTICAL WAVEGUIDE AND OPTICAL INTEGRATED CIRCUIT

(75) Inventor: Tatemi Ido, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/261,480

(22) Filed: Feb. 26, 1999

(30) Foreign Application Priority Data

Aug. 10, 1998 (JP) .................................................. 10-238010

(51) Int. Cl.$^7$ .................................................. G02B 6/26
(52) U.S. Cl. .................................................. 385/45; 385/39
(58) Field of Search .................................. 385/39, 45, 28

(56) References Cited

U.S. PATENT DOCUMENTS

| 5,333,219 | * | 7/1994 | Kuznetsov | 385/45 |
| 5,524,156 | * | 6/1996 | Van Der Tol | 385/45 |
| 5,757,995 | * | 5/1998 | Chen et al. | 385/45 |

FOREIGN PATENT DOCUMENTS

| 4-172308 | 6/1992 | (JP) . |
| 8-122547 | 5/1996 | (JP) . |
| 9-113743 | 5/1997 | (JP) . |

OTHER PUBLICATIONS

"PLC Hybrid Integrated Optical WDM Transceiver Module",NTT R&D vol. 46, No. 5, 1997, pp. 473–485 (No Month).

"Sillca–based 1XN Splitter for Optical Communication Systems", Proceedings of the Electronics Society Conference of IECE (The Institute of Electronics, Information and Communication Engineers) 1995, SC–1–15. p. 337 (No Month).

"Optimization of Strongly Guiding Semiconductor Rib Waveguide Y–Junctions", IEEE Photonics Technology Letters, vol. 2, No. 6, Jun. 1990.

"Compact Components for Semiconductor Photonics Switches", Photonics in Switching, Apr. 21–25, 1996, pp. 73–74.

* cited by examiner

Primary Examiner—James Phan
(74) Attorney, Agent, or Firm—Kenyon & Kenyon

(57) ABSTRACT

The present application provides an asymmetric Y branch optical waveguide capable of obtaining an asymmetric branching ratio stably with a low radiation loss, and a lightwave circuit and an optical transmission system both using the asymmetric Y branch optical waveguide. The asymmetric Y branch optical waveguide according to the present application has a waveguide (I) for input, two waveguides (III) for output, and a multi-mode waveguide (II) disposed between the waveguides (I) and (II). The present Y branch optical waveguide is constructed in such a manner that the width of the multi-mode waveguide, extending in the direction intersecting with an optical axis changes discontinuously at a portion where the input waveguide and the multi-mode waveguide are connected to each other, and the multi-mode waveguide is asymmetric with respect to a center line extending in the direction of the optical axis to allow optical peaks to respectively appear in each individuals of the two output waveguides. Thus, a difference occurs between peak's heights in each light-intensity distribution having two peaks, which appears due to mode interference, so that the asymmetry of a branching ratio can be implemented.

23 Claims, 9 Drawing Sheets

WAVEGUIDE FOR INPUT (I) | MULTI-MODE WAVEGUIDE (II) | WAVEGUIDE FOR OUTPUT (III)

WAVEGUIDE FOR INPUT (I) | MULTI-MODE WAVEGUIDE (II) | WAVEGUIDE FOR OUTPUT (III)

WAVEGUIDE FOR INPUT (I) | MULTI-MODE WAVEGUIDE (II) | WAVEGUIDE FOR OUTPUT (III)

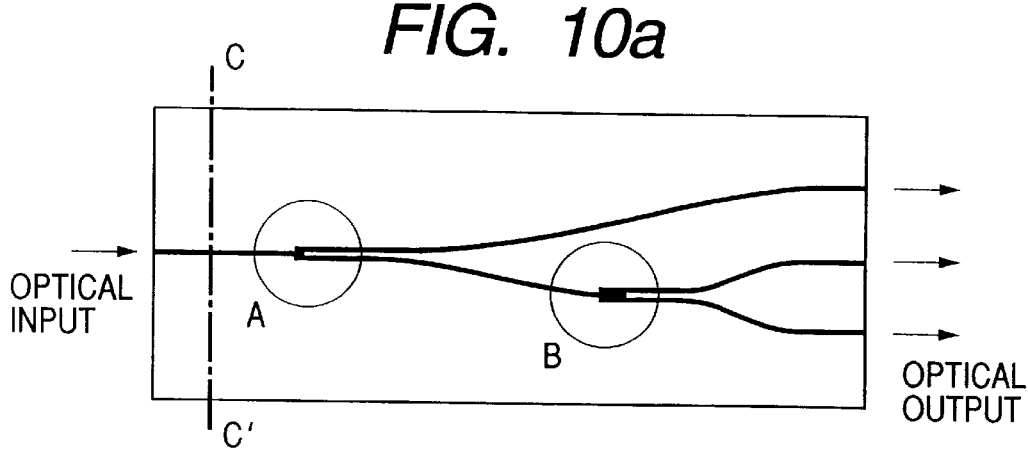
FIG. 10a
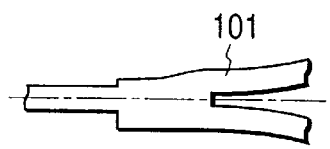
FIG. 10b
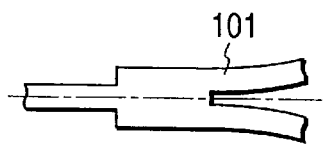
FIG. 10c
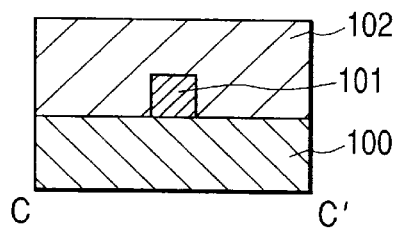
FIG. 10d
FIG. 11
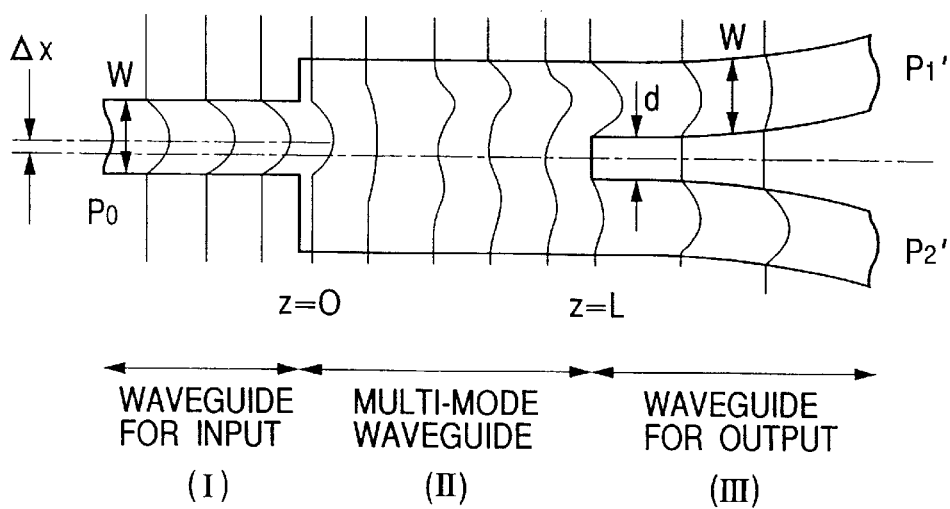

Y BRANCHING OPTICAL WAVEGUIDE AND OPTICAL INTEGRATED CIRCUIT

FIELD OF THE INVENTION

The present invention of the present application relates to an optical waveguide and a lightwave circuit.

BACKGROUND OF THE INVENTION

A study of a lightwave circuit in which optical waveguides, Y branch optical waveguides, and directional couplers each composed of silica (glass) or polymer or the like are brought into integration on a substrate, has recently been brought into activation with a view toward aiming at reductions in the sizes and costs of optical parts. The Y branch optical waveguide is important as an element which constitutes the lightwave circuit. In order to reduce its branch excess loss, Y branch optical waveguides having various structures have been discussed.

While a symmetric optical waveguide whose branching ratio is 1:1, has been usually discussed as a Y branch optical waveguide, an asymmetric Y branch optical waveguide having a different branching ratio is required according to uses. An asymmetric Y branch using a silica (glass) waveguide has been described in, for example, "NTT R&D", Vol. 46, No.5, 1997, pp.473–485 (Article 1) or "Proceedings of the 1995 Electronics Society Conference of the Institute of Electronics, Information and Communication Engineers", SC-1-15, pp.337–338 (Article 2). An optical transmission and reception module excellent in received sensitivity and a splitter having an arbitrary number of branches have been implemented by using such an asymmetric Y branch optical waveguide.

Described specifically, the former (Article 1) example has an input waveguide, a tapered waveguide for extending or spreading incident light, and two output waveguides. Further, the branching ratio is rendered asymmetric by shifting the input waveguide and the tapered waveguide from a central axis by a predetermined value. In the latter (Article 2) example on the other hand, the width of a core at each input terminal or end of a branch optical waveguide is set as W1 and the widths of cores at two output terminals or ends are respectively set as W0. Further, a tapered waveguide is provided in which each core width gradually spreads from W1 to W0 along a light traveling direction L. The branching ratio is made asymmetric by setting an increase ratio dW/dL of each core width to different values with two waveguides which are caused to branch off.

SUMMARY OF THE INVENTION

Problems on the hitherto-used prior art will be made clear prior to the description of the invention of the present application. Namely, when the asymmetric Y branch optical waveguide described as the conventional example is actually fabricated, the following problems arise.

In the former (Article 1), a tip of a clearance or interval defined between the output waveguides is brought into rounded form (whose width is about 3 μm) because of the resolution of photolithography and side etching or the like which occurs upon core patterning. Light incident to each output waveguide has a large light intensity at a central portion. Thus, since the light is scattered at the round portion, a radiation loss occurs in a Y branch. The radiation loss is relatively small and negligible in an optical waveguide in which a refractive index difference between each core and a clad is relatively small (e.g., when the refractive index difference is less than or equal to 0.3%). However, when a waveguide having the large refractive index difference is used (e.g., when the refractive index difference is 0.45% or above), the radiation loss becomes extremely great, thus leading to practical trouble.

On the other hand, in the latter (Article 2), an asymmetric Y branch is designed so as not to produce a radiation loss excessively by taking a wedge-shaped structure even if the width between waveguides is finite. However, since a portion strong in light or light intensity is incident to and scattered at a slit portion, a large radiation loss eventually occurs in a waveguide in which a refractive index difference between each core and a clad is large. Further, the width of each input end of the branch waveguide become narrowed to a half extent as compared with other portions. Thus, when the waveguide is formed by a weak material such as polymer or the like, a region for this is apt to have a possibility of the waveguide being cracked by stress or the like. Further, when a Y branch is actually fabricated, defects such as voids (bubbles) might occur in a narrow portion between the branch waveguides upon forming an upper clad layer and embedding the Y branch therein. Therefore, since a portion strongest in light falls on or hits the defects even in the case of any conventional asymmetric Y branches, a large radiation loss occurs.

An object of the present invention is to provide an asymmetric Y branch optical waveguide which provides less radiation losses and has a stable branching ratio, and a lightwave circuit using the asymmetric Y branch optical waveguide. The present asymmetric Y branch optical waveguide and the lightwave circuit using it are useful for use in an optical transmission system or an optical network or the like.

The present inventors have reconsidered various configurations of the Y branch optical waveguide over its entirety with a view toward solving the problems of the aforementioned conventional example. With respect to the invention of the present application, the present inventors have paid attention to a multi-mode interference (multi-mode interference: hereinafter abbreviated as "MMI") type Y branch optical waveguide as an optical waveguide, and considered the fabrication of an asymmetric Y branch by using it. With respect to the MMI type Y branch, a symmetric (1:1) Y branch is known as will be described later. However, an asymmetric Y branch is not known. The present inventors have carried out an extensive investigation about the MMI type Y branch and have found out that an asymmetric Y branch optical waveguide having less radiation losses and a stable branching ratio could be obtained by contriving its structure.

Namely, an asymmetric Y branch optical waveguide according to the invention of the present application comprises an input waveguide for entering light therein, two output waveguides for outputting the light therefrom, and a multi-mode waveguide which is disposed between the input waveguide and the two output waveguides and generates a plurality of mode lights therefrom, and wherein the multi-mode waveguide is made asymmetric with respect to a center line extending in the direction of an optical axis.

Here, the configuration of asymmetry can be obtained by the following methods, for example. The first is a method of setting the width of one of entrances or entrance portions of a multi-mode waveguide, which are divided by a center line so as to be smaller than that of its corresponding exit portion of the multi-mode waveguide. The second is a method of setting the width of one of intermediate portions of the multi-mode waveguide, which are divided by the center line so as to be smaller than that of its corresponding exit portion of the multi-mode waveguide. On the other hand, even in the case of either of the first and second, the exit portions of the multi-mode waveguide are set symmetrically with respect to the center line extending in the direction of the optical axis.

Further, an embodiment of another asymmetric Y branch optical waveguide according to the invention of the present application comprises an input waveguide for entering light therein, two output waveguides for outputting the light therefrom, and a multi-mode waveguide which is disposed between the input waveguide and the two output waveguides and generates a plurality of mode lights therefrom, and wherein the distances between sides of core portions of the multi-mode waveguide and a center line differ from each other at least at a portion with respect to the direction of traveling of the light.

When it is desired to allow the distances between the sides of the core portions and the center line to differ from each other, the distance is changed into form curved with respect to the traveling direction of the light, for example. In this case, a variation in the distance between one side of the core portion of the multi-mode waveguide and the center line may be set gentle in the vicinity of each exit of the multi-mode waveguide. Further, the distance between one side of the core portion of the multi-mode waveguide and the center line may be increased from the entrance to its corresponding exit, and the variation in the distance may be reduced in the vicinity of the entrance and exit as compared with an intermediate portion of the multi-mode waveguide.

Described specifically, for example, the distance between one side of the core portion of the multi-mode waveguide and the center line is set so as to increase in sine function form from the entrance to its corresponding exit or in Raised Sin form. Further, offsets each having a predetermined width may be provided at the entrances of the two output waveguides. Owing to such a construction, a radiation loss can be reduced even when a refractive index difference between each core and a clad constituting the multi-mode waveguide is greater than 0.3%. Here, the core and clad are respectively composed of a polymer material or a silica-system material.

The asymmetric Y branch optical waveguide according to the invention of the present application can be suitably used in a lightwave circuit. Such a lightwave circuit includes an asymmetric Y branch optical waveguide disposed between an input waveguide and a plurality of output waveguides and constructed so that a multi-mode waveguide is made asymmetric with respect to a center line extending in the direction of an optical axis. The lightwave circuit is brought into integration by utilizing another asymmetric Y branch optical waveguide and a symmetric Y branch optical waveguide in combination as needed.

Thus, an asymmetric Y branch optical waveguide which provides less radiation losses and has a stable branching ratio and a lightwave circuit using the same can be obtained.

According to the invention of the present application, an asymmetric Y branch optical waveguide having less radiation losses and a stable branching ratio and a lightwave circuit using it can be obtained.

Incidentally, the above description has been made by the so-called Y branch optical waveguide provided with the two output waveguides. However, the inventive idea of the invention of the present application can be applied even to an optical waveguide having a larger number of output waveguides.

Typical various modes or embodiments of the invention related to the present application will hereinafter be listed as follows:

The first mode is an optical waveguide comprising an input waveguide for entering light therein, a plurality of output waveguides for outputting the light therefrom, and a multi-mode waveguide which is disposed between the input waveguide and the plurality of output waveguides and generates a plurality of mode lights and wherein the multi-mode waveguide is constructed so as to be asymmetric with respect to a center line extending in the direction of an optical axis.

Incidentally, generally in an optical transmission in dual direction, for Y branch optical waveguide light may be also transmitted from the second optical waveguide designated output waveguide as above-mentioned to the first optical waveguide designated input waveguide as above-mentioned. However, in the following description of the specification of the present application, the first optical waveguide is designated "Input Waveguide" and a plurality of the second optical waveguides are designated as "Output Waveguide" for easier understanding of the explanation. Because one problem of the present invention to be solved is the one for branching light from the first optical waveguide to the second optical waveguide.

The second is an optical waveguide wherein in the Y branch optical waveguide according to the first embodiment, the width of one of entrance portions of the multi-mode waveguide, which are divided by the center line, is smaller than that of its corresponding exit portion of the multi-mode waveguide.

The third is an optical waveguide wherein in the Y branch optical waveguide according to the first embodiment, the width of one of intermediate portions of the multi-mode waveguide, which are divided by the center line, is smaller than that of its corresponding exit portion of the multi-mode waveguide.

The fourth is an optical waveguide having an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the width extending in the direction intersecting an optical axis, of the multi-mode waveguide changes discontinuously at a portion where the input waveguide and the multi-mode waveguide are connected to one another, and the multi-mode waveguide is made asymmetric with respect to a center line extending in the direction of the optical axis.

The fifth is an optical waveguide having an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the width of the multi-mode waveguide, extending in the direction intersecting an optical axis changes discontinuously at a portion where the input waveguide and the multi-mode waveguide are connected to one another, and the width of at least one of entrance portions of the multi-mode waveguide is smaller than that of its corresponding exit portion of the multi-mode waveguide.

Now, details of various forms of discontinuity of the connecting portion between the input waveguide and the multi-mode waveguide will be described later.

The sixth is an optical waveguide having an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the multi-mode waveguide is constructed so as to be made asymmetric with respect to a center line extending in the direction of an optical axis, and the plurality of output waveguides are respectively placed in positions in the multi-mode waveguide, where a plurality of optical peaks appear.

The seventh is an optical waveguide wherein in the Y branch optical waveguide according to the sixth, the width of the multi-mode waveguide, extending in the direction intersecting the optical axis varies discontinuously at a connecting portion between the input waveguide and the multi-mode waveguide, and the multi-mode waveguide is constructed so as to be asymmetric with respect to the center line extending in the direction of the optical axis.

The eighth is a Y branch optical waveguide which has an first optical waveguide, two of second output waveguides, and wherein the first optical waveguide and the two second optical waveguides are connected by using a multi-mode waveguide which is disposed between them, and the width of the first optical waveguide extending in the direction orthogonal to an extension of an optical axis changes discontinuously at a portion where the first optical waveguide and the multi-mode optical waveguide are connected each other, and the multi-mode optical waveguide has shapes formed asymmetrically with respect to the extension of a center line, extending in the direction of the optical axis, of the first optical waveguide so that the propagation light has a first peak and a second peak different in light intensity from each other in association with each of the two second optical waveguides when the light is incident from the first optical waveguide.

The ninth is a Y branch optical waveguide according to the above-said eight, wherein at least a side of a core region of a connecting portion between said first optical waveguide and the multi-mode optical waveguide has a transition region, and extensions of both sides of a core region of the first optical waveguide and a core region of the multi-mode optical waveguide, both being connected to both sides of the transition region, intersect each other.

The tenth is a Y branch optical waveguide according to the above-said ninth, wherein extensions of both sides of a core region of the first optical waveguide and a core region of the multi-mode optical waveguide, both being connected to both sides of the transition region, are orthogonal to each other.

The eleventh is a Y branch optical waveguide according to the above-said eight, wherein a discontinuous portion of the connecting portion between said first optical waveguide and said multi-mode optical waveguide is formed such that the width of said first optical waveguide, extending in the direction intersecting with the extension of the optical axis varies over a length of less than or equal to 50 times, comparing to the wavelength in the optical waveguide of light propagated through the corresponding optical waveguide.

The twelfth is a Y branch optical waveguide which has an first optical waveguide, two of second output waveguides, and wherein the first optical waveguide and the two second optical waveguides are connected by using a multi-mode waveguide which is disposed between them, and the width of the optical waveguide extending in the direction orthogonal to an extension of an optical axis changes discontinuously at a portion where the first optical waveguide and the multi-mode optical waveguide are connected each other, and the multi-mode optical waveguide has shapes formed asymmetrically with respect to the extension of the center line, extending in the direction of the optical axis, of the first optical waveguide so that distributions of light intensities at a surface intersecting an optical axis of propagation light at the right angle thereto have two maximum values different in light intensity from each other when the light is incident from the first optical waveguide and the respective light-intensity distributions having the two maximum values respectively correspond to the two second optical waveguides.

The thirteenth is a lightwave circuit having a Y branch optical waveguide which has an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the multi-mode waveguide is constructed so as to be made asymmetric with respect to a center line extending in the direction of an optical axis and the plurality of output waveguides are respectively placed in positions in the multi-mode waveguide, where a plurality of optical peaks appear.

The fourteenth is a lightwave circuit having a Y branch optical waveguide which has an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the multi-mode waveguide is constructed asymmetrically with respect to a center line extending in the direction of an optical axis in such a manner that respective optical peaks appear in each individuals of the plurality of output waveguides.

The fifteenth is a lightwave circuit having a Y branch optical waveguide which has an input waveguide for entering light therein, a plurality of output waveguides for outputting the light therefrom, and a multi-mode waveguide which is disposed between the input waveguide and the plurality of output waveguides and generates a plurality of mode lights therefrom, and wherein the width of the multi-mode waveguide, extending in the direction intersecting an optical axis changes discontinuously at a portion where the input waveguide and the multi-mode waveguide are connected to one another, and the multi-mode waveguide is constructed so as to be asymmetric with respect to a center line extending in the direction of the optical axis.

Incidentally, it is needless to say that the various methods for constructing the asymmetric structures of the aforementioned optical waveguides can be applied to the various forms or embodiments of the invention referred to above.

BRIEF DESCRIPTION OF THE DRAWINGS

FIG. 9b is a cross-sectional view taken along line A–A' of FIG. 9a;

FIG. 10a is a plan view showing one example of a lightwave circuit fabricated by using the asymmetric Y branch optical waveguide according to the present invention;

FIG. 10b is an enlarged view of a portion A thereof;

FIG. 10c is an enlarged view of a portion B thereof;

FIG. 10d is a cross-sectional view taken along line C–C' of FIG. 10a;

FIG. 11 is a plan view showing another example of a configuration of an asymmetric Y branch optical waveguide;

PREFERRED EMBODIMENTS OF THE INVENTION

Figure 1:
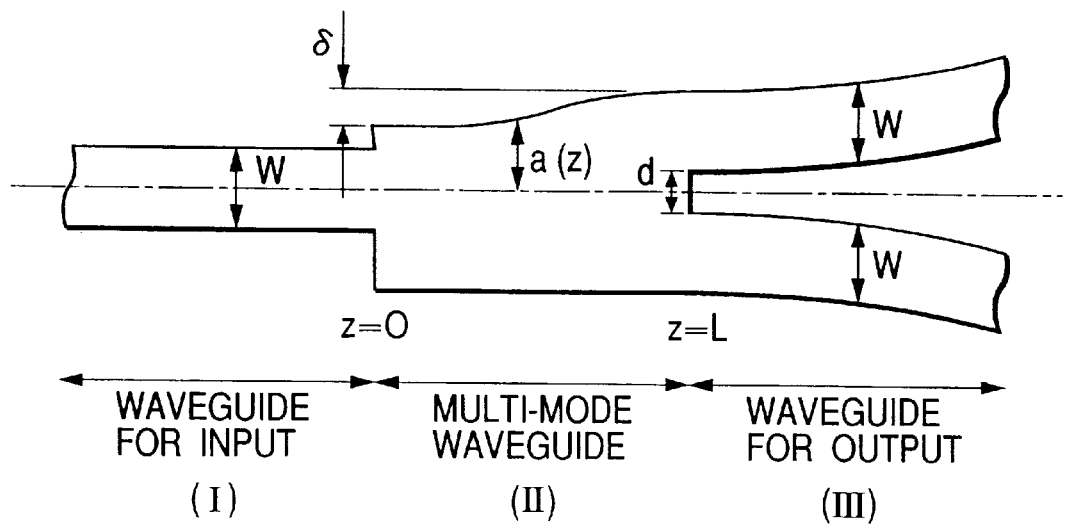
FIG. 1 is a plan view showing one embodiment of an asymmetric Y branch optical waveguide according to the present invention.

Prior to the description of embodiments according to the invention of the present application, a multi-mode interference (multi-mode interference: MMI) type Y branch employed in the invention of the present application will first be described. A technique for forming a Y branch using a multi-mode waveguide has been described in, for example, IEEE PHOTONICS TECHNOLOGY LETTERS, VOL. 2, NO.6, 1990, pp.404–406, or Extended Abstracts (The 55th Autumn Meeting, 1994) at The Japan Society of Applied Physics, Third Separate Volume, 19p-R-2, p.908. They have been discussed in the field of a semiconductor optical waveguide in particular. A symmetric Y branch using a branching ratio 1:1 has been used in view of its use.

An MMI-type Y branch optical waveguide shown as an example comprises a waveguide for input, a multi-mode waveguide, and two waveguides for output. When a fundamental-mode light, which propagates through the input waveguide, enters into the multi-mode waveguide, a fundamental-mode light (n=0) and a high-order mode light (n=2) are generated in the multi-mode waveguide, so that the waveform of the propagating light is deformed due to the interference resultant from the difference in phase velocity between both mode lights. Thus, the propagating light has intensity distributions each having two peaks at portions where both mode lights are different in phase exactly by $\pi$. The symmetric Y branch of the branching ratio 1:1 can be achieved by placing the two output waveguides in association with the portions.

The following methods are considered as methods for bringing such an MMI-type Y branch into asymmetry. (1) the first is a method for shifting the input waveguide from its central axis by $\Delta x$, (2) the second is a method for making the multi-mode waveguide asymmetric with respect to the center line, and (3) the third is a method for making the output optical waveguides asymmetric with respect to the center line. As a result of discussions of these methods, the second method has been found to be most useful.

Let's first consider the aforementioned third method. A reduction in optical coupling occurs when two crest- or ridge-like beams symmetric with respect to the center line, which are produced at output ends of a multi-mode waveguide, are launched into their corresponding output waveguides. Therefore, a large radiation loss is liable to occur. Thus, the present method is impractical.

The above-described first method was next discussed. In a Y branch optical waveguide shown in FIG. 11, a state of propagation of light was calculated by a beam propagation method (BPM). FIG. 11 shown by way of example is a plan view schematically showing a Y branch optical waveguide in which a waveguide (I) for input, a multi-mode waveguide (II) and two waveguides (III) for output are coupled to one another. In the drawing, only a waveguide portion through which light propagates, is typically illustrated. P0 indicates the intensity of incident light, and P1' and P2' respectively indicate light intensities at individual output waveguides of the two output waveguides (III). W indicates the width extending in the direction intersecting the optical axis of each of the input and output waveguides, $\Delta x$ indicates the difference between the center lines of the input waveguide and each output waveguide, and d indicates the interval between the two output waveguides. z indicates the distance extending from an input end of the multi-mode waveguide (II). The position at z=L indicates the position of each input end of the output waveguides (III). In FIG. 11, a plurality of thin or slender lines shown so as to intersect each waveguide typically show optical modes at their respective positions. Further, dashed lines in the drawing indicate the center lines of the waveguides respectively.

Incidentally, reference numerals shown in plan views and the like for other optical waveguides respectively indicate portions similar to those shown in FIG. 11.

Figure 3:
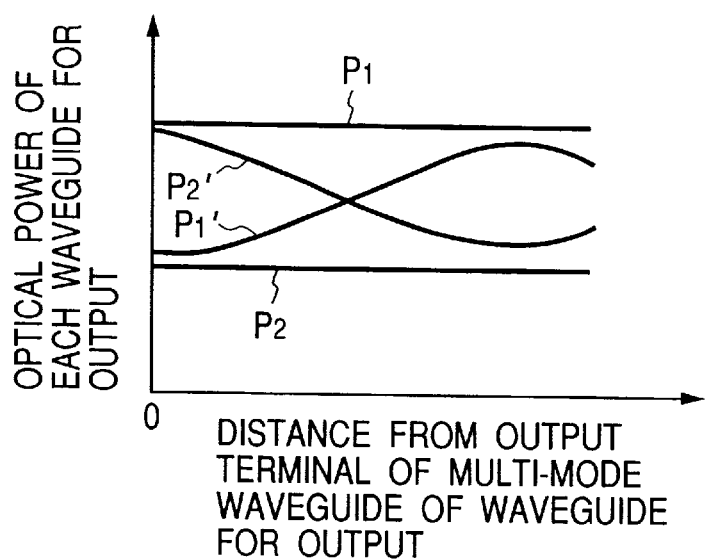
FIG. 3 is a view illustrating optical power of respective output waveguides of the asymmetric Y branch optical waveguide according to the present invention.

An example of a calculation result on the propagation state of the light is shown in FIG. 3. This result is obtained when respective geometrical parameters are as follows. Namely, the present result is equivalent to a result obtained at the time that a refractive index of a core portion of the corresponding optical waveguide is set as 1.52, the difference in refractive index between a core and a clad is set as 0.45%, an input/output waveguide width (w) is set as 6.5 $\mu$m, an output waveguide interval (d) is set as 3 $\mu$m, a multi-mode waveguide length (L) is set as 245 $\mu$m and $\Delta x$ is set as 4 $\mu$m. FIG. 3 is a view showing the relationship between the distance from the exit or outlet of a multi-mode waveguide, of an output waveguide and optical power of each output waveguide. In FIG. 3, P1' and P2' respectively indicate optical power of the respective output waveguides from the calculated result referred to above. Incidentally, P1 and P2 respectively indicate optical power of the respective optical waveguides employed in an asymmetric Y branch optical waveguide indicative of the invention of the present application. This will be described later.

It is understood from the result shown in FIG. 3 that the respectively light intensities (optical power) P1' and P2' are replaced with each other according to the distances z extending from the exits of the multi-mode waveguide, of the output waveguides at the two output waveguides (III) of the asymmetric Y branch optical waveguide shown in FIG. 11, so that a stable branching ratio is hard to be achieved. This results from the fact that due to a variation in the optical power, the branching ratio changes greatly according to a variation in the wavelength and a variation in the interval between the output waveguides. This change in optical power is considered to occur due to the fact that an odd mode (n=1) occurs in an output waveguide region by shifting the input waveguide from the central axis and interference occurs between the odd mode (n=1) and the fundamental mode (n=0).

The above-described second method was next discussed. This method is a method according to the invention of the present application. This method takes a configuration shown in FIG. 1 by way of example. FIG. 1 is a plan view showing one embodiment of the invention of the present application by a Y branch optical waveguide in which a waveguide (I) for input, a multi-mode waveguide (II) and two waveguides (III) for output are coupled to each other. Respective reference numerals in the drawing are similar to those in FIG. 11 referred to above.

In the present embodiment, a multi-mode waveguide (II) having a length L is firstly disposed between an input waveguide (I) having a width w and two output waveguides (III) whose widths are defined as w and whose initial waveguide interval is given as d. Secondly, in order to make the multi-mode waveguide asymmetric, a part of a core at an input end of the multi-mode waveguide is reduced by δ, and the distance between the side of each core and the center line is gradually returned to the original state according to a function a(z) with respect to the traveling direction of light. This is one embodiment of the present invention. Thus, phase velocities of light propagated through the multi-mode waveguide are made asymmetric with respect to the center line. Therefore, a difference occurs between crest's heights in each of two-crestal light-intensity distributions which appear due to mode interference, so that a branching ratio can be made asymmetric.

Figure 2:
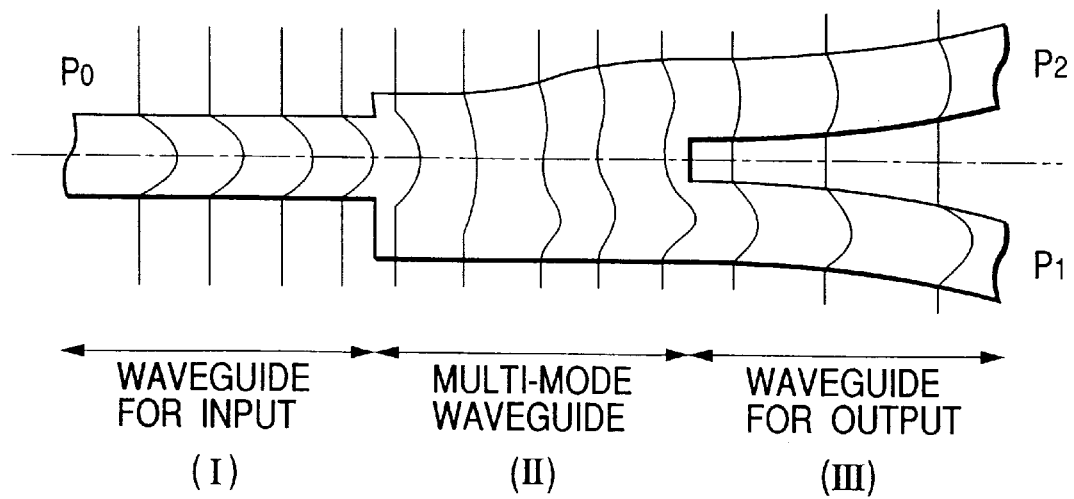
FIG. 2 is a view showing light-intensity distributions in the asymmetric Y branch optical waveguide according to the present invention.

FIG. 2 is a view showing the state of two-crestal light-intensity distributions which appear due to mode interference in the embodiment shown in FIG. 1. In FIG. 2, a plurality of thin or slender lines shown so as to intersect each waveguide typically show optical modes at their respective positions. As shown in the drawing, light, which passes through the input waveguide (I) at a light intensity P0, produces two-crestal light-intensity distributions due to mode interference in the multi-mode waveguide (II). The two-crestal light-intensity distributions are made asymmetric due to the structure of the above-described multi-mode waveguide. They are propagated toward the two output waveguides (III) as light intensities P1 and P2.

Results of calculations of optical propagation by the beam propagation method (BPM) in the Y branch optical waveguide having such a structure are represented as P1 and P2. As is understood from FIG. 3, the respective light intensities (optical power) P1 and P2 of the two output waveguides are not so varied with respect to the distances z from the exits of the multi-mode waveguide, of the output waveguides, and a stable branching ratio can be implemented. This is considered to take place because the generation of an odd mode (n=1) is restrained in an output waveguide region since the two output waveguides are placed symmetrically with respect to the center line of the input waveguide, whereby the lack of stability due to the mode interference does not occur.

As a result of discussions of various embodiments to be further described later with the above-described technical idea as the basics, the second case in which asymmetry has been introduced into the multi-mode waveguide, has been found to be a method of implementing the stablest branching ratio as an object of the present invention.

In order to couple light to each output waveguide with a low radiation loss at each exit of the multi-mode waveguide, the length of the multi-mode waveguide may be set so that two-crestal peaks due to the mode interference appear strongly. Further, in order to couple the light to each output waveguide with a lower loss at each exit of the multi-mode waveguide, a wave front in the vicinity of the exit may preferably be made vertical to the center line. To this end, it is necessary to loosen variations in structures in the vicinity of the exits of the multi-mode waveguide. Further, since the output waveguides are placed symmetrically with respect to the center line, it is necessary to set structures at output ends of the multi-mode waveguide symmetrically with respect to the center line.

Figure 5:
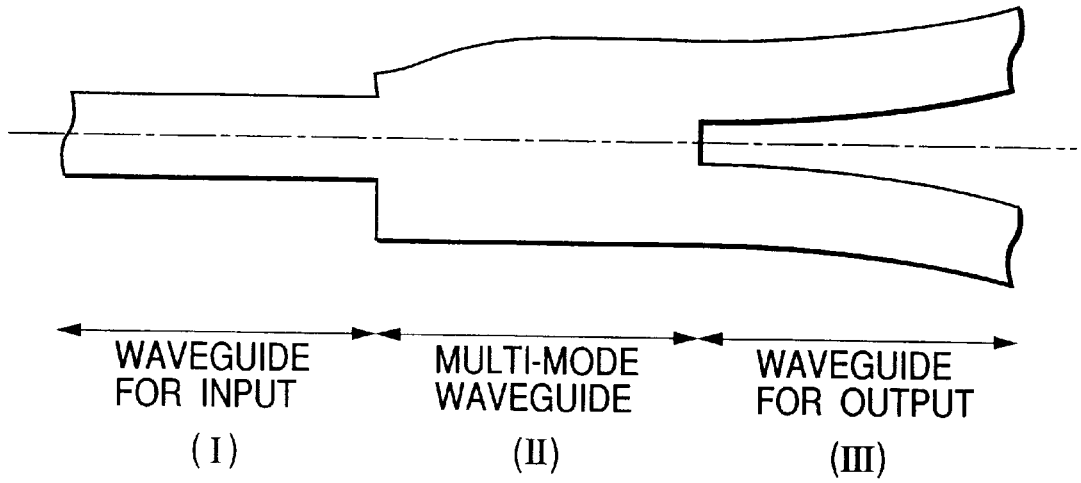
FIG. 5 is a plan view showing another embodiment of an asymmetric Y branch optical waveguide according to the present invention.
Figure 6:
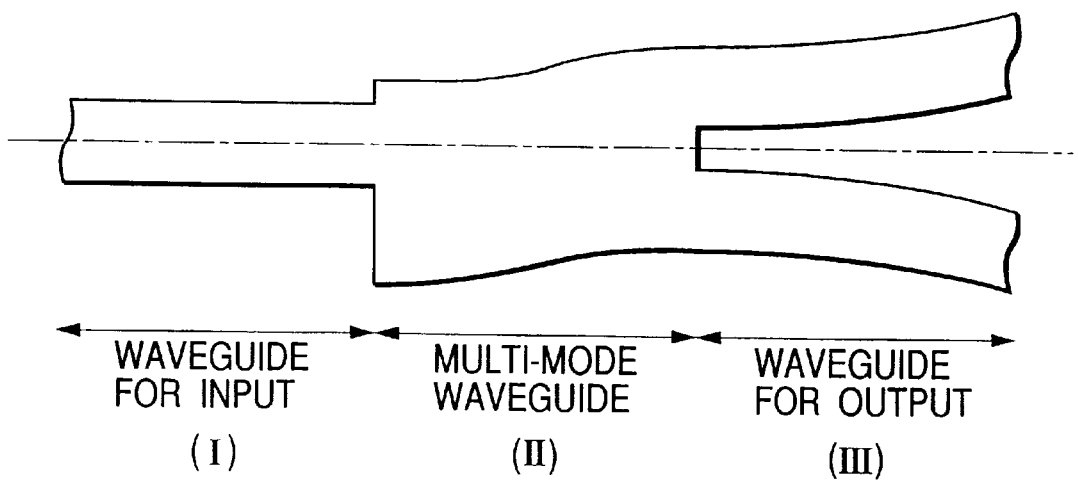
FIG. 6 is a plan view illustrating a further embodiment of an asymmetric Y branch optical waveguide according to the present invention.
Figure 7:
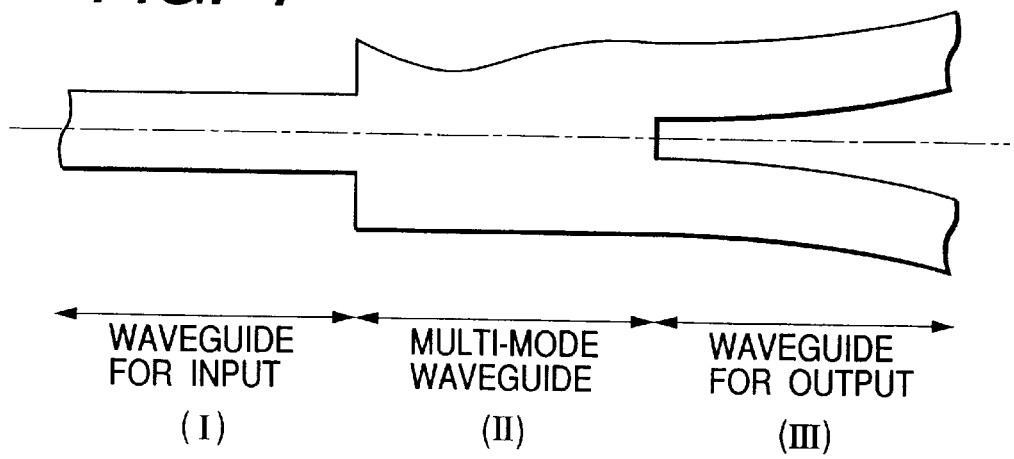
FIG. 7 is a plan view depicting a still further embodiment of an asymmetric Y branch optical waveguide according to the present invention.

As the structures for meeting these demands, any structure examples shown in FIGS. 5 through 7 by way of example can be used in addition to the above structure shown in FIGS. 1 and 2. FIGS. 5 through 7 are respectively plan views schematically showing asymmetric Y branch optical waveguides according to the invention of the present application, wherein waveguides (I) for input, multi-mode waveguides (II) and two waveguides (III) for output are connected to one another in a manner similar to the various examples described up to now. FIG. 5 is a view showing another embodiment of the asymmetric Y branch optical waveguide. The present embodiment is one wherein the boundary or border between an upper core and a clad of a multi-mode waveguide is shaped in the form of a mountain-like curve. FIG. 6 is also a view illustrating a further embodiment of the asymmetric Y branch optical waveguide according to the present invention. In the present embodiment, the boundary between an upper core and a clad of a multi-mode waveguide is similar to FIGS. 1 and 2, and the boundary between a lower core and the clad thereof is also shaped in the form of a curve. FIG. 7 is a view depicting a still further embodiment of the asymmetric Y branch optical waveguide according to the present invention. In the present embodiment, the boundary between an upper core and a clad at an intermediate portion of a multi-mode waveguide is formed so as to take a curve depressed on the center line side. It is needless to say that various embodiments based on the idea of the invention of the present application can be adopted without depending on the embodiments illustrated herein.

In order to effectively bring the branching ratio into asymmetry and implement a low-radiation Y branch here, the asymmetry of the widths of both waveguides with respect to the center line in the vicinity of the entrance or inlet of the multi-mode waveguide are taken so as to be greater than the asymmetry of the widths of the waveguides with respect to the center line in the vicinity of the outlets of the multi-mode waveguide. Further, structures symmetric with respect to the center line may preferably be used in the vicinity of the exits thereof. Although the widths of the waveguides with respect to the center line in the vicinity of the exits of the multi-mode waveguide do not necessarily require symmetry, the symmetric setting is suitable for obtaining a stable branching ratio as mentioned above.

Namely, one embodiment of the invention of the present application has a waveguide for input, which enters light therein, a plurality of waveguides for output, which output the light therefrom, and a multi-mode waveguide placed between the input waveguide and the plurality of output waveguides and which generates a plurality of mode lights. Further, the present embodiment is constructed so that the multi-mode waveguide is made asymmetric with respect to a center line extending in the direction of an optical axis. The plurality of output waveguides are respectively provided at positions where a plurality of optical peaks in the multi-mode waveguide appear. Further, another embodiment of the invention of the present application is related to a Y branch optical waveguide having a waveguide for input, which enters light therein, a plurality of waveguides for output, which output light therefrom, and a multi-mode waveguide disposed between the input waveguide and the plurality of output waveguides and which generates a plurality of mode lights. In the present embodiment, the multi-mode waveguide is made asymmetric with respect to a center line extending in the direction of an optical axis in such a manner that optical peaks respectively appear in their corresponding output waveguides. Even in this case, however, structures symmetric with respect to the center line of each waveguide may preferably be used in the vicinity of exits of the multi-mode waveguide.

Since light exists only in the vicinity of the center line even if a structure in which the upper or lower boundary between a core and a clad is kept away from the center line in the vicinity of the entrance of the multi-mode waveguide is adopted in each plan view, a branching ratio cannot be made asymmetric so effectively. A method for effectively executing asymmetry is as follows: It is necessary to allow either upper or lower boundary between the core and the clad to approach the center line over a long range to some extent in the vicinity of the entrance thereof. The range over which either upper or lower boundary between the core and the clad is allowed to approach the center line in the vicinity of the entrance, depends on the width of the multi-mode waveguide, which extends in the direction intersecting the optical axis, a required branching ratio, etc. However, the range is usually set to about half of the length extending in the direction of the optical axis, of the multi-mode waveguide.

Thus as shown in FIG. 1, it is preferable to allow the boundary between the upper core and the clad to approach the center line at the entrance of the multi-mode waveguide and reduce a change in the distance from the center line in the neighborhood of the entrance and each exit and increase it in a central portion. As a specific example, may be mentioned an example in which the distance between the center line and the boundary between the core and the clad is changed with respect to the traveling direction of light along a sine functional curve given by the following equation 1 or a Raised Sin form curve given by the following equation 2.

$$a(Z)=a_{ave}-\delta/2\,\cos[\pi(z/L)]\qquad\text{equation 1}$$

where $a_{ave}$ indicates an average width extending from the center line of the multi-mode waveguide, $\delta$ indicates a reduced width of part of the core at the input end of the multi-mode waveguide ($\delta>0$), z indicates the distance extending in the traveling direction of light, and L indicates the distance from the input end of the multi-mode waveguide to an input end of each output waveguide, respectively. Incidentally, $a_{ave}-\delta/2$ indicates the width of a core at an input end having an asymmetric portion of the multi-mode waveguide, whereas $a_{ave}+\delta/2$ indicates the width of a core at an output end on the side having the asymmetric portion of the multi-mode waveguide.

$$a(z)=a_{min}+\delta[z/L-L/(2\pi)\sin[2\pi(z/L)]]\qquad\text{equation 2}$$

where $a_{min}$ indicates the width of the core at the input end having the asymmetric portion of the multi-mode waveguide. Thus, ($a_{min}+\delta$) results in the width of the core at each output end having the asymmetric portion of the multi-mode waveguide. Further, other respective parameters in the equation 2 are similar to those in the equation 1.

Figure 4:
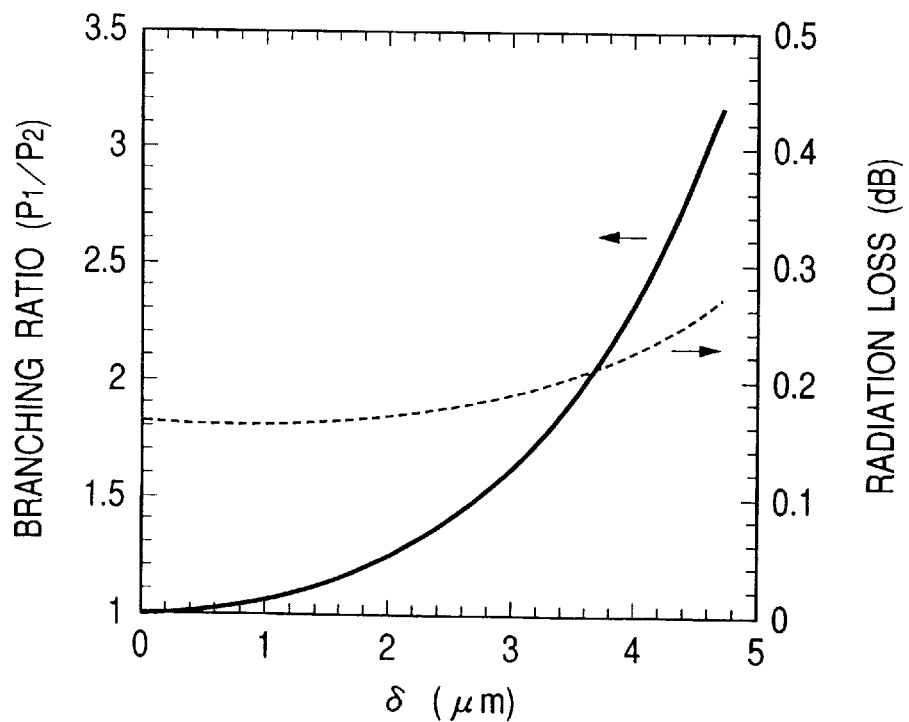
FIG. 4 is a view depicting the relationship between a branching ratio and a radiation loss of the asymmetric Y branch optical waveguide according to the present invention.

FIG. 4 shows the result of calculations of a branching ratio (P1/P2) and a radiation loss (operating wavelength: 1.3 $\mu$m) at the time that the shape of the core is changed to a Raised Sin form. The horizontal axis indicates a reduced width $\delta$ of part of a core at an input end of a multi-mode waveguide, a solid line indicates a branching ratio, and a dotted line indicates a radiation loss. This calculation method is a BPM method. A model of its optical waveguide is one shown in FIG. 1. Respective parameters used are as follows: A refractive index of the core of the optical waveguide was set as 1.520, a refractive index difference between the core and the clad was set as 0.45%, an input/output waveguide width (w) was set as 6.5 $\mu$m, an interval (d) between output waveguides was set as 3 $\mu$m, and a multi-mode waveguide length (L) was set as 245 $\mu$m. Further, the distance between the center line of a waveguide and the boundary between the core and the clad was changed to the Raised Sin form represented by the above-described equation 2. It is understood from FIG. 4 that an asymmetric Y branch can be implemented over a wide branching-ratio range from 1 to over 3 by changing $\delta$. As seen in FIG. 4, a small value of 0.3 dB or less can be ensured over the above range as the radiation loss.

Figure 8A:
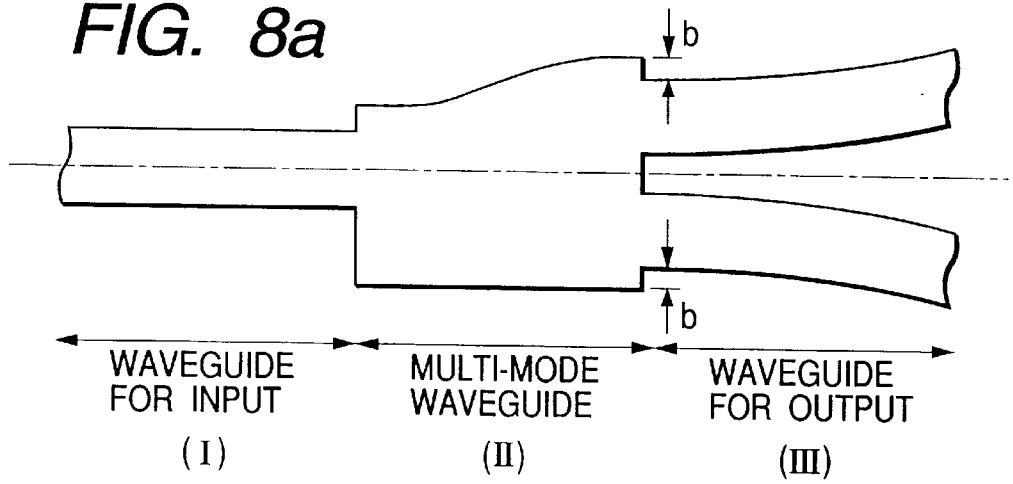
FIGS. 8a and 8b are respectively plan views showing still further embodiments of asymmetric Y branch optical waveguides according to the present invention.
Figure 8B:
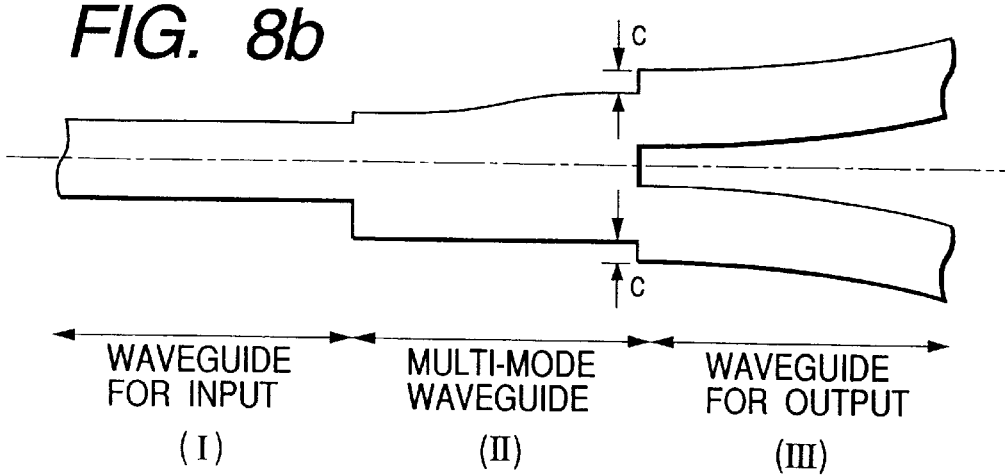

FIGS. 8a and 8b are respectively plan views showing other embodiments of asymmetric Y branch optical waveguides according to the present invention. They are examples in which the peak of ridges, which appear at exits or outlets of a multi-mode waveguide, is caused to coincide with the center of each output waveguide. Described specifically, an offset b or c is provided at an entrance of each output waveguide. As a result, an asymmetric Y branch can be brought to a lower loss. It is thus preferable to use an offset structure for the purpose of achieving the lower loss and allow the peak of the ridges appearing at each exit of the multi-mode waveguide to coincide with the center of each output waveguide. It is needless to say that it is more preferable to allow both of these to completely coincide with each other.

Whether either one of the structures shown in FIGS. 8a and 8b is adopted, is determined according to a refractive index of a waveguide and a bent form of each output waveguide in the optical waveguide, etc. In general, the shape shown in FIG. 8a is often adopted in the case of a waveguide using a semiconductor material, whereas the shape shown in FIG. 8b is often adopted in the case of a waveguide using resin or glass. Further, the extent (corresponding to the extent of the offset b or c in FIG. 8a or 8b) of the offset is also determined according to the refractive index of the waveguide and the curved shape of each output waveguide in the corresponding waveguide, etc. In general, the values of these offsets b and c are often selected from ranges from approximately 0.2 µm to 1.5 µm or so.

Details of various forms of discontinuity of a connecting portion between the input waveguide and the multi-mode waveguide will next be explained.

In the various embodiments of the respective waveguides shown in the respective drawings of FIGS. 1, 2, 5, 6, 7, 8a, 8b, 9a, 10b, 10c and 11 illustrated up to now, regions other than regions in which curved portions are intentionally introduced, are indicated by straight lines. For example, the connecting portion between the input waveguide and the multi-mode waveguide is indicated by the outside shape of an intersecting core portion. In the practical form of waveguide, however, a portion thereof having an angle has a micro rounding portion. It is needless to say that the extent of the rounding portion depends on a material which makes up the waveguide and its manufacturing method.

Figure 14:
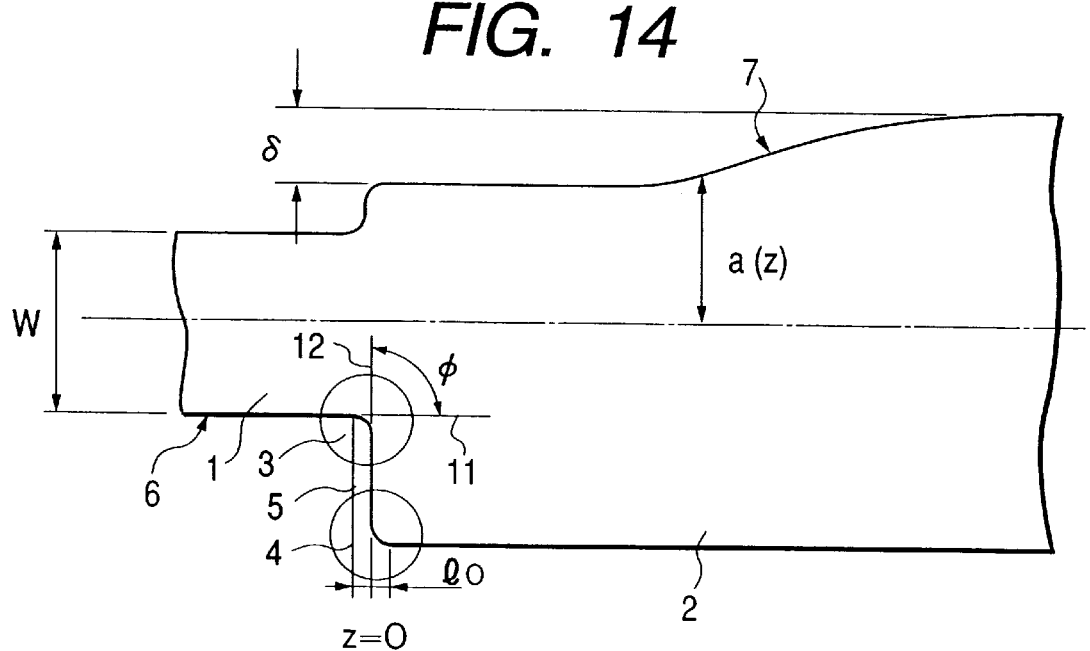
FIG. 14 is a plan view showing, in enlarged form, connecting portions of an input waveguide and a multi-mode waveguide of an asymmetric Y branch optical waveguide according to the present invention.

FIG. 14 is a plan view showing, in enlarged view, a portion for connecting an input waveguide and the multi-mode waveguide both employed in one example of an asymmetric Y branch optical waveguide according to the invention of the present application. Respective reference numerals in the drawing are similar to those shown in the plan views of the waveguides described up to now. An input waveguide 1 and a multi-mode waveguide 2 are coupled to one another at a position of Z=0. Incidentally, a curved portion designated at numeral 7 in FIG. 14 indicates a region related to the invention of the present application, which is constructed so that the multi-mode waveguide 2 is made asymmetric with respect to the center line extending in the direction of an optical axis in a manner similar to FIG. 1. While the portion for connecting the input waveguide 1 and the multi-mode waveguide 2 to one another is illustrated in FIG. 14, consideration must be given to the fact that similar rounding portions occur in the entire corners of the optical waveguide. It is needless to say that such rounding portions are based on a manufacturing method. A rounding portion like this in accordance of the form is produced also at an outlet of the multi-mode waveguide 2.

Let's now take note of a lower portion of the waveguide. A rounding portion is provided at a corner portion 3 of a portion for connecting the corresponding input waveguide 1 and multi-mode waveguide 2. Similarly, a rounding portion is also provided even at a corner portion 4 on the outer side of the multi-mode waveguide 2. In the present example, at least the side of a core region of the connecting portion between the input waveguide 1 and the multi-mode waveguide 2 has a transition region. Further, both sides (6, 5) of both a core region of the input waveguide and a core region of the multi-mode waveguide, lying both sides of the transition region intersect each other. In the example of FIG. 14, an angle φ formed between an extension 10 of the core region of the input waveguide and an extension 11 of the core region of the multi-mode waveguide is given as the right-angle. In the invention of the present application, the multi-mode waveguide 2 is constructed so as to be asymmetric with respect to the center line extending in the direction of the optical axis in agreement with such discontinuity of the connecting portion. As a result, the light propagates through the multi-mode waveguide 2 in a multi mode, and the respective peaks appear in each individuals of the two output waveguides connected to the multi-mode waveguide 2. In the invention of the present application, the angle φ can be set even to an obtuse angle and an acute angle along with the effect referred to above. However, there may be cases in which the angle φ is set to the obtuse angle in most cases.

FIG. 14 shows the example in which processing accuracy is relatively high. However, a further reduction in processing accuracy might occur. Even in this case, the invention of the present application can be achieved.

Figure 15:
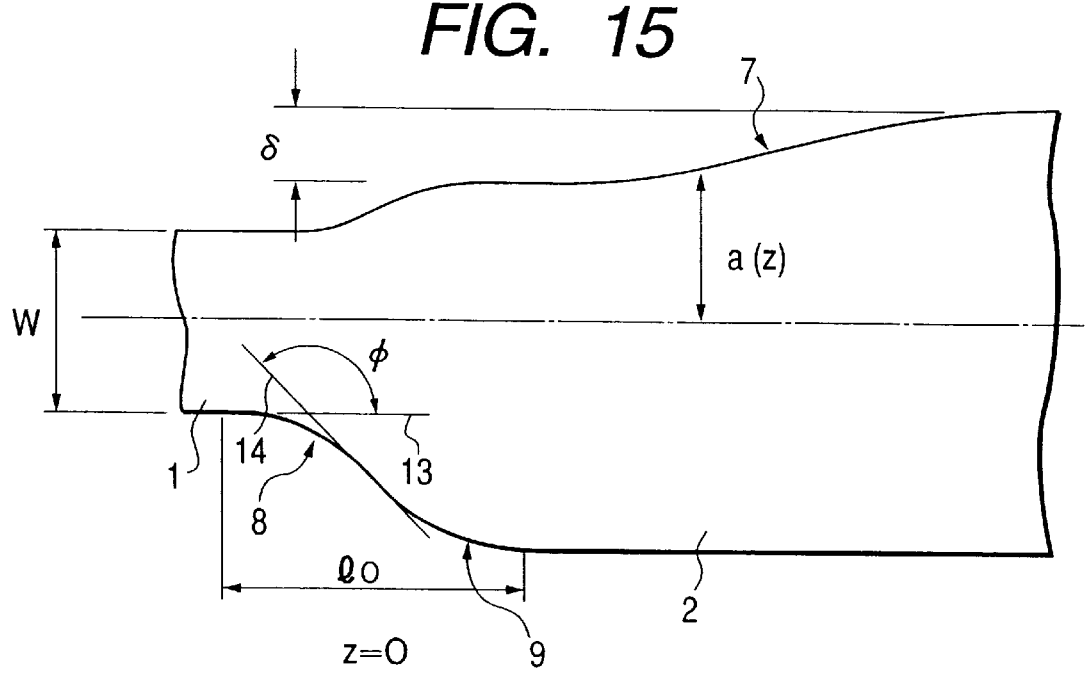
FIG. 15 is a plan view illustrating, in enlarged form, connecting portions of an input waveguide and a multi-mode waveguide employed in another embodiment of the asymmetric Y branch optical waveguide according to the present invention.

FIG. 15 is a plan view showing, in enlarged view, a portion for connecting an input waveguide and the multi-mode waveguide both employed in another example of an asymmetric Y branch optical waveguide according to the invention of the present application. Respective reference numerals in the drawing are similar to those shown in the plan views of the waveguides described up to now. An input waveguide 1 and a multi-mode waveguide 2 are coupled to one another at a position of Z=0. Incidentally, a curved portion designated at numeral 7 in FIG. 15 indicates a region related to the invention of the present application, which is constructed so that the multi-mode waveguide 2 is made asymmetric with respect to the center line extending in the direction of an optical axis in a manner similar to FIG. 14. While the portion for connecting the input waveguide 1 and the multi-mode waveguide 2 to one another is illustrated in FIG. 15, consideration must be given to the fact that similar rounding portions occur in the entire corners of the optical waveguide. It is needless to say that such rounding portions are based on a manufacturing method.

The example shown in FIG. 15 is an example in which the rounding region is provided in relatively large form. Thus, both sides (6, 5) of both the core region of the input waveguide and the core region of the multi-mode waveguide illustrated in the example of FIG. 14 in particular respectively have transition regions (8, 9) larger than those in the example of FIG. 14 at their connecting portion. An extension of the side of the core region of the input waveguide and a tangential line at an inflection point of a line formed by the sides of both core regions at the portion for connecting the input waveguide and the multi-mode waveguide intersect at an obtuse angle. In the example shown in FIG. 15, an angle φ formed by an extension 13 of the core region of the input waveguide and an extension of a tangential line 14 at an inflection point of the core region of the multi-mode waveguide is given as an obtuse angle.

When such a relatively large transition region is provided, if the width of waveguide varies largely at the desired some distance, a plurality of mode are exited, so mode interfere occurs. In the case, the length $l_0$ in the direction of an optical axis of the region (so-called the direction of extension of the input waveguide) needs to varies over at least a length of less than or equal to 50 times the wavelength ($\lambda$) in the waveguide, of light propagated through the waveguide. Incidentally, the wavelength ($\lambda$) in the waveguide is represented by $\lambda_0/n$. Here, $\lambda_0$ indicates the wavelength of light in a vacuum, and n indicates the refractive index of the core of the waveguide. Further, the length $l_0$ may preferably be less than or equal to 20 times the wavelength ($\lambda$) of the light in the waveguide to get branching with low losses.

While the transition region is illustrated in enlarged form in FIGS. 14 and 15, the present region ranges from 1 µm to 20 µm or so. On the other hand, the length of the multi-mode waveguide ranges from approximately 100 µm to 400 µm or so although various forms exist. Thus, even if the transition region including the above-described rounding portions are provided, it does not basically disturb a basic idea of an optical characteristic of the waveguide. Thus, even in the case of the example shown in FIG. 15 having the relatively large transition region, for example, a discontinuous variation in the width, extending in the direction intersecting the direction of the optical axis, of the portion for connecting the input waveguide and the multi-mode waveguide is enough for the width of the connecting portion.

While the embodiments of the invention of the present application have been described above, they are put in order and their main embodiments will be listed as follows:

(1) The first is an optical waveguide having an input waveguide for entering light therein, two output waveguides for outputting the light therefrom, and a multi-mode waveguide which is disposed between the input waveguide and the two output waveguides and generates a plurality of mode lights and wherein the multi-mode waveguide is constructed so as to be asymmetric with respect to a center line extending in the direction of an optical axis.

(2) The second is the optical waveguide described in the paragraph (1), wherein the width of one of entrance portions of the multi-mode waveguide, which are divided by the center line, is narrower than that of its corresponding exit portion of the multi-mode waveguide.

(3) The third is the optical waveguide described in the paragraph (1), wherein the width of one of intermediate portions of the multi-mode waveguide, which are divided by the center line, is narrower than that of its corresponding exit portion of the multi-mode waveguide.

(4) The fourth is the optical waveguide described in any of the paragraphs (1) through (3), wherein the exit portions of the multi-mode waveguide are constructed so as to be symmetric with respect to the center line extending in the direction of the optical axis.

(5) The fifth is an optical waveguide having an input waveguide for entering light therein, two output waveguides for outputting the light therefrom, and a multi-mode waveguide which is disposed between the input waveguide and the two output waveguides and generates a plurality of mode lights, and wherein the distances between the sides of core portions of the multi-mode waveguide and a center line are constructed so as to differ from each other at least at a portion.

(6) The sixth is the optical waveguide described in the paragraph (5), wherein the distance between at least one side of the core portion of the multi-mode waveguide and the center line is constructed so as to change in the form of a curve with respect to the traveling direction of light.

(7) The seventh is the optical waveguide described in the paragraph (6), wherein a variation in the distance between one side of the core portion of the multi-mode waveguide and the center line is constructed so as to gently occur in the vicinity of each exit of the multi-mode waveguide.

(8) The eighth is the optical waveguide described in the paragraph (5), wherein the distance between one side of the core portion of the multi-mode waveguide and the center line increases from the entrance to its corresponding exit, and the variation in the distance is constructed so as to decrease in the vicinity of the entrance and each exit as compared with each intermediate portion of the multi-mode waveguide.

(9) The ninth is the optical waveguide described in the paragraph (5), wherein the distance between one side of the core portion of the multi-mode waveguide and the center line is constructed so as to increase in sine function form from the entrance to its corresponding exit.

(10) The tenth is the optical waveguide described in the paragraph (5), wherein the distance between one side of the core portion of the multi-mode waveguide and the center line is constructed so as to increase in Raised Sin form from the entrance to its corresponding exit.

(11) The eleventh is the optical waveguide described in any of the paragraphs (5) to (10), wherein offsets each having a predetermined width are provided at their corresponding entrances of the two output waveguides.

(12) The twelfth is an optical waveguide which comprises an input waveguide for entering light therein, a plurality of output waveguides for outputting the light therefrom, and a multi-mode waveguide which is disposed between the input waveguide and the plurality of output waveguides and in which the distances between the boundaries in an optical-axis direction between cores forming a waveguide and a clad, and a center line are constructed so as to differ from each other at at least a portion with respect to the traveling direction of light.

(13) The thirteenth is the optical waveguide described in the paragraph (12), wherein a refractive index difference between each core referred to above and the clad is greater than 0.3%.

(14) The fourteenth is the optical waveguide described in the paragraph (12) or (13), wherein the core and clad are respectively composed of a polymer material or a silica material.

(15) The fifteenth is an optical waveguide constructed such that a plurality of mode lights are generated by a multi-mode waveguide having asymmetric structures and a plurality of output waveguides are disposed at portions where a plurality of peaks appear due to the interference of the mode lights.

(16) The sixteenth is an optical waveguide having an input waveguide for entering light therein, two output waveguides for outputting the light therefrom, and a multi-mode waveguide which is disposed between the input waveguide and the two output waveguides and generates a plurality of mode lights therefrom, and wherein the width extending in the direction intersecting an optical axis, of the multi-mode waveguide changes discontinuously at a portion where the input waveguide and the multi-mode waveguide are connected to one another, and the multi-mode waveguide is made asymmetric with respect to a center line extending in the direction of the optical axis.

(17) The seventeenth is an optical waveguide having an input waveguide for entering light therein, two output waveguides for outputting the light therefrom, and a multi-mode waveguide which is disposed between the input waveguide and the two output waveguides and generates a plurality of mode lights therefrom, and wherein the width of the multi-mode waveguide, extending in the direction intersecting an optical axis changes discontinuously at a portion where the input waveguide and the multi-mode waveguide are connected to one another, and the width of at least one of entrance portions of the multi-mode waveguide is smaller than that of its corresponding exit portion of the multi-mode waveguide.

(18) The eighteenth is an optical waveguide having an input waveguide for entering light therein, two output waveguides for outputting the light therefrom, and a multi-mode waveguide which is disposed between the input waveguide and the two output waveguides and generates a plurality of mode lights therefrom, and wherein the multi-mode waveguide is constructed so as to be made asymmetric with respect to a center line extending in the direction of an optical axis, and the two output waveguides are respectively placed in positions in the multi-mode waveguide, where a plurality of optical peaks appear.

(19) The nineteenth is the optical waveguide described in the paragraph (18), wherein the width extending in the direction intersecting the optical axis of the multi-mode waveguide varies discontinuously at a connecting portion between the input waveguide and the multi-mode waveguide, and the multi-mode waveguide is constructed so as to be asymmetric with respect to the center line extending in the direction of the optical axis.

(20) The twentieth is an optical waveguide having an input waveguide for entering light therein, two output waveguides for outputting the light therefrom, and a multi-mode waveguide which is disposed between the input waveguide and the two output waveguides and generates a plurality of mode lights therefrom, and wherein the multi-mode waveguide is constructed asymmetrically with respect to a center line extending in the direction of an optical axis in such a manner that respective optical peaks appear in each individuals of the two output waveguides.

(21) The twenty-first is the optical waveguide described in the paragraph (20), wherein the width of the multi-mode waveguide, extending in the direction intersecting with the optical axis changes discontinuously at a connecting portion of the input waveguide and the multi-mode waveguide, and the multi-mode waveguide is constructed so as to be asymmetric with respect to the center line extending in the optical-axis direction.

Namely, it is needless to say that various modes or embodiments of the aforementioned optical waveguide having an asymmetric structure can be adopted into various nodes of the invention.

A so-called lightwave circuit can be configured by using the above-described various optical waveguides related to the invention of the present application. Thus, a lightwave circuit installed on one substrate can be implemented by utilizing optical waveguides having the above-described respective characteristics or a plurality of these various optical waveguides in combination. In addition to a hybrid lightwave circuit, even such a lightwave circuit can be configured in which various members are brought into integration by using a semiconductor material, for example. The listing of these various integrated circuits will be omitted in the present specification, only typical forms will be described below.

(22) The twenty-second is a lightwave circuit which includes an asymmetric Y branch optical waveguide constructed in such a manner that a multi-mode waveguide placed between an input waveguide and a plurality of output waveguides becomes asymmetric with respect to a center line extending in the direction of an optical axis.

(23) The twenty-third is the lightwave circuit described in the paragraph (22), which has a symmetric Y branch optical waveguide connected to one output waveguide of the asymmetric Y branch optical waveguide.

Specific examples of embodiments of the invention will next be described.

Figure 9A:
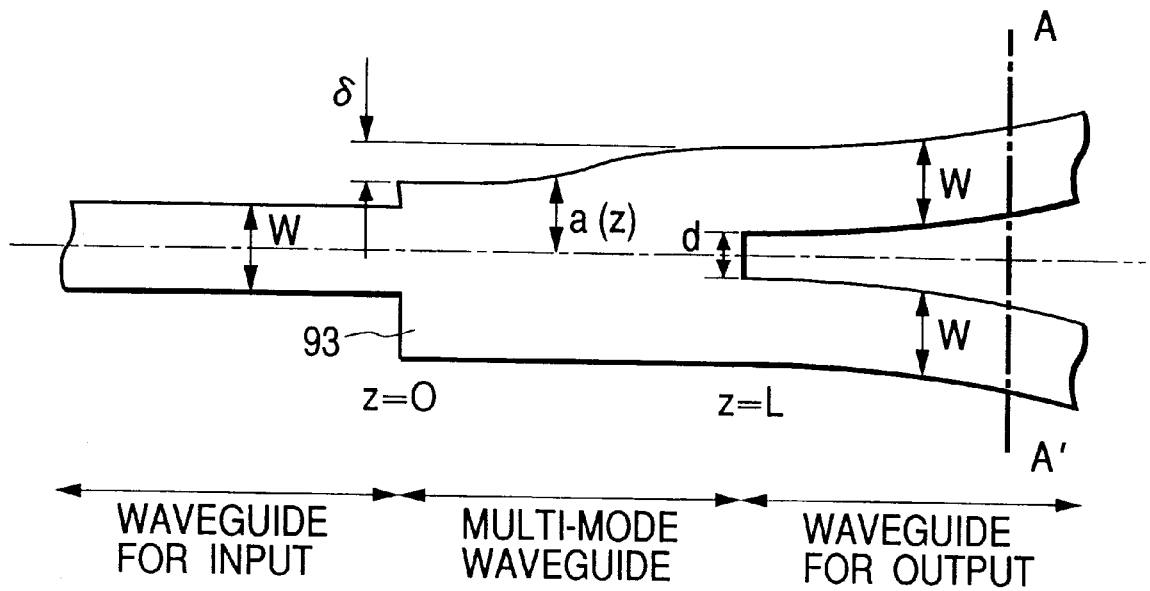
FIG. 9a is a plan view illustrating one example of the asymmetric Y branch optical waveguide according to the present invention.
Figure 9B:
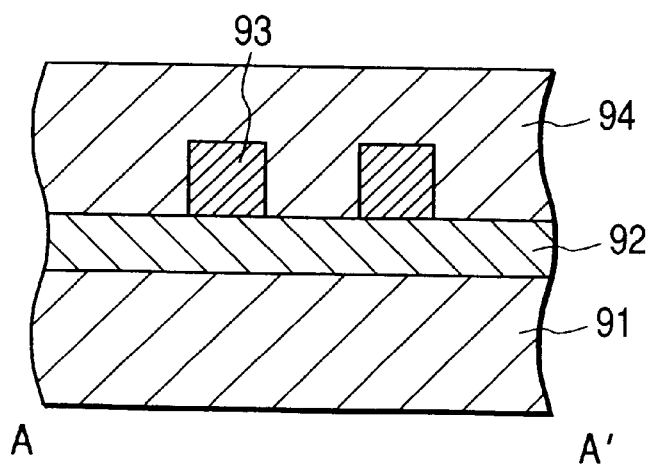

FIG. 9a is a plan view showing one example of an asymmetric Y branch optical waveguide according to the present invention. FIG. 9b is a cross-sectional view taken along line A–A' in FIG. 9a. Respective parameters shown in the drawing are similar to those described up to now. The example shown in FIG. 9a corresponds to an example in which an optical waveguide is formed using a resin, specially, an organic polymer resin or organic polymer. Materials capable of being usually employed in the optical waveguide can be utilized as such resinous materials.

A method of manufacturing the corresponding asymmetric Y branch optical waveguide is as follows. An asymmetric Y branch is first fabricated by a usual method using polymer. Namely, two types of polymers different from each other, are successively repeatedly applied on and baked onto a substrate 91 such as Si or silica or the like, thereby to form a resinous film having a desired thickness. Thus, a lower clad 92 (whose thickness is 10 $\mu$m and whose refractive index is 1.520) and each core 93 (whose thickness is 6.5 $\mu$m and whose refractive index is 1.527) are formed. Next, a photomask is provided on the so-prepared substrate and an unnecessary portion is removed by reactive ion etching, whereby the core 93 is processed into a form shown in the drawing. At this time, respective dimensions thereof are set as w=6.5 $\mu$m, L=245 $\mu$m, d=3.0 $\mu$m and $\delta$=4.6 $\mu$m, respectively. Further, the distance a(z) between the boundary between one core and the clad and a center line is changed in the Raised Sin form given from the above-described equation 2 at a multi waveguide. After the removal of the photomask from the substrate, polymer is applied thereon and baked thereto again. An upper clad 94 (which is 15 $\mu$m in thickness and 1.520 in refractive index) is formed in this way. Fluorinated polyimide was used as a specific polymer material. Two types of fluorinated polyimides each varied in refractive index by changing a fluorinating rate thereof can be obtained. The substrate is cut into desired form by dicing and a single mode fiber is coupled to its end surface thereby to form a splitter module. As a result of the evaluation on a branch characteristic of the splitter module, a stable value of 1:3 (±0.3) was obtained as a branching ratio of this asymmetric Y branch. Further, a small value of 0.3 dB was obtained as a radiation loss of this splitter module.

According to such an embodiment, even if the distance between the output waveguides is relatively large or the refractive index difference between the core and clad is relatively large, a low-loss asymmetric Y branch can be implemented in the present invention. Since only a relatively weak light intensity exists in a place where a slight defect occur, even if the defect occurs between the branches, there is also a merit in causing no large excessive loss.

FIG. 10a is a plan view showing one example of a lightwave circuit manufactured by using an asymmetric Y branch optical waveguide according to the present invention. FIG. 10b is an enlarged view of a portion A, FIG. 10c is an enlarged view of a portion B, and FIG. 10d is a cross-sectional view taken along line C–C', respectively. The example of FIG. 10a corresponds to an example in which an optical waveguide is formed by an inorganic material. As illustrative examples thereof, may be mentioned silica, glass, a semiconductor material, etc. However, usually-available materials can be utilized as such materials.

The present lightwave circuit shows a silica-system waveguide optical splitter having, specifically, a branching ratio of 1:n (where n: integer), e.g., 1:3. As seen in FIG. 10d, an SiO$_2$ core 101 (which is 6.8 $\mu$m in thickness and 1.467 in refractive index) doped with Ge is provided on a silica substrate 100 (whose refractive index is 1.460) by flame hydrolysis deposition and anneal. A photomask is provided on the so-prepared substrate, followed by dry etching, thereby processing the core 101 into such form as shown in the drawing. Thereafter, the mask is removed from the substrate and an SiO$_2$ upper clad 102 (whose thickness is 20 $\mu$m) is formed by flame hydrolysis deposition and anneal. Here, a 1:2 asymmetric Y branch (w=6.8 $\mu$m, d=4.0 $\mu$m, L=255 $\mu$m and d=3.1 $\mu$m) in which the distance between one boundary and a center line is changed into sine functional form given by the equation 1, is provided at a portion A as seen in FIG. 10a at a multi-mode waveguide. Similarly, a conventional symmetric MMI type Y branch (w=6.8 $\mu$m, d=0 $\mu$m, L=255 $\mu$m and d=3.1 $\mu$m) is provided at a portion B. A chip or device is cut into desired form from the substrate by dicing and four optical fibers in total, are bonded to input and output end surfaces. The loss of the so-obtained 1:3 splitter at a wavelength of 1.3 µm results in 5.4±0.2 dB. It was confirmed that an excessive loss of a 1:3 coupler attained a low loss of 0.2 dB from this characteristic.

The above-described embodiment has described the case in which the asymmetric Y branch waveguide is fabricated by using polymer or silica (glass) as the materials for the core and clad in particular. However, even if other materials such as a semiconductor material, LiNbO3, etc., or a material comprised of a combination thereof, i.e., various materials capable of usually constituting the optical waveguide are used in addition to the above, the invention of the present application can be implemented in a manner similar to the above. An optical transmission and reception module excellent in receiving sensitivity can be obtained by manufacturing it using the asymmetric Y branch optical waveguide according to the present invention.

An example of an optical communication device or system using the invention of the present application will next be described.

Figure 12:
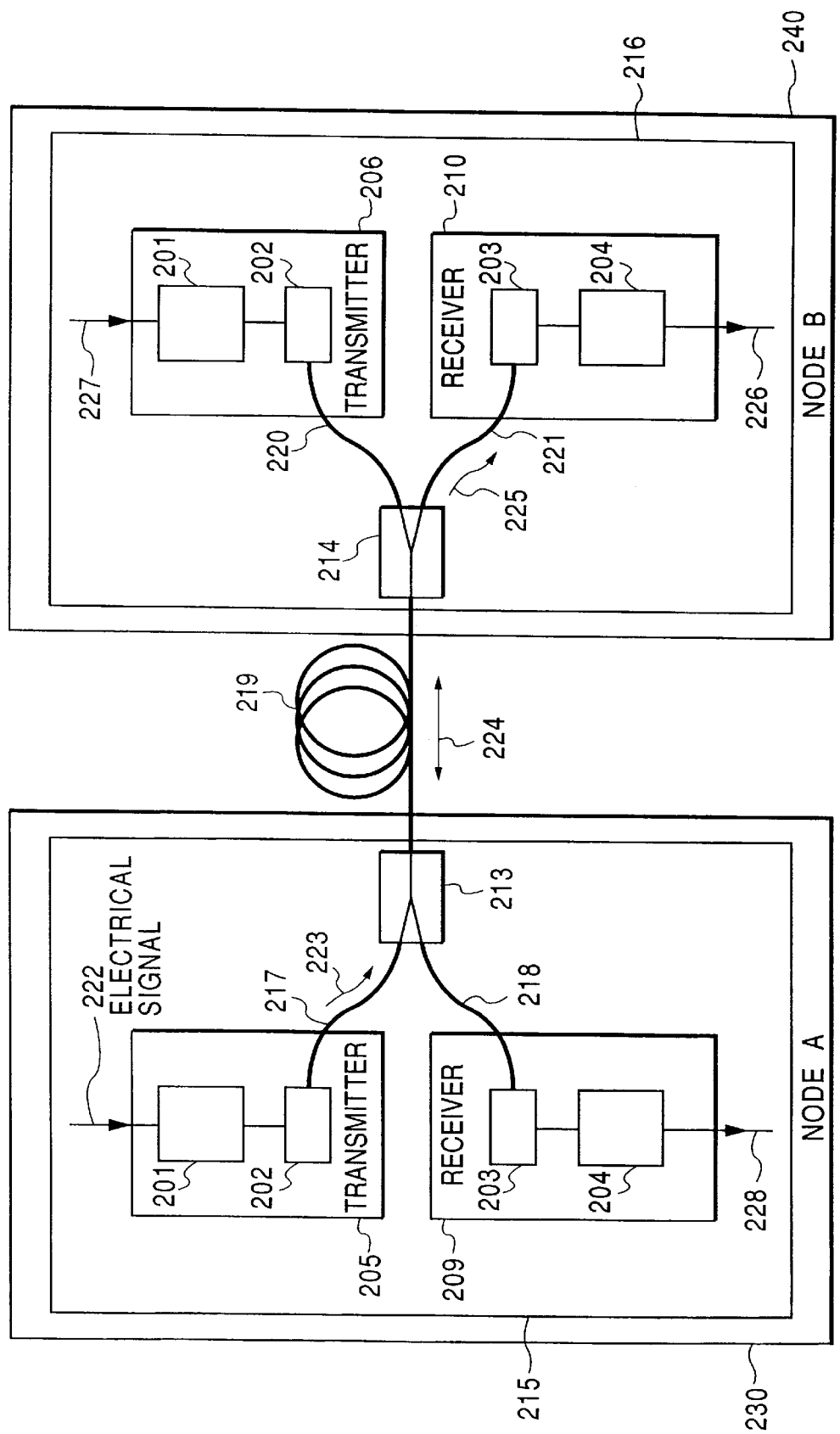
FIG. 12 is a view illustrating an example of a configuration of an optical transmission system using an asymmetric Y branch optical waveguide.

FIG. 12 is a view typically showing a bi-directional optical communication system using an asymmetric Y branch optical waveguide related to another embodiment of the invention of the present application. In FIG. 12, a station or node A 230 and a station or node B 240 are respectively provided with at least transceivers (215, 216) having transmitters (205, 206), receivers (209, 210), and splitter modules (213, 214). In particular, the splitter modules (213, 214) are respectively constructed so as to have the asymmetric Y branch optical waveguide according to the invention of the present application. The respective various examples of the asymmetric Y branch optical waveguides described by the embodiments mentioned up to now can be used as the corresponding asymmetric Y branch optical waveguide as a matter of course. It is needless to say that the asymmetric Y branch optical waveguide described herein indicates the one in which its branches are asymmetric with each other and its branching ratio is not given as 1:1. In particular, the asymmetric Y branch optical waveguide using polymer is practical in terms of mass production, cost, etc.

The transmitters 205 and 206 of the nodes A and B have at least drive circuits 201 and light sources 202 respectively. A semiconductor laser device is normally used as the light source 202. On the other hand, the receivers 209 and 210 of the nodes A and B have at least light-receptive parts 203 and receiving circuits 204 respectively. A photodiode is normally used as the light-receptive part 203.

Optical fibers (217, 218, 219, 220, 221) are connected to end surfaces of both splitter modules (213, 214). While the optical fiber 221 is shown between both the splitter modules (213, 214) in the present example, it is needless to say that various devices and various members necessary for optical communications, such as an optical fiber amplifier, a repeater, etc. are provided as needed.

Basic operation of the configuration shown in FIG. 12 is as follows. An electric signal 222 inputted to the transmitter 205 of the node A 230 is amplified, for example, by the drive circuit 201 and thereafter converted to a light signal 223 by the light source 202. The light signal 223 passes through the asymmetric Y branch optical waveguide 213 of the node A and further passes through a desired optical transmission line 219. A light signal 224 inputted to the node B is divided into signal light by the asymmetric Y branch optical waveguide 214 of the node B. Of these, the branch light 225 is inputted to the light-receptive part 203 of the receiver 210 of the node B 240, where it is converted into an electric signal. The converted electric signal is amplified, for example, by the corresponding receiving circuit 204 of the receiver 210 and thereafter processed as a received signal 226. On the other hand, the light propagated toward the transmitter side of the asymmetric Y branch optical waveguide 214 is reduced low in branching ratio on the transmitter side, so that it does not create a problem on substantial transmission. Alternatively, various configurations based on the demand for a desired optical system, such as the use of an isolator on the transmitter side, etc. are allowed. Incidentally, the transmission of a signal from the node B240 to the node A 230 is also performed in a manner similar to the aforementioned transmitting and receiving method. A signal transmitted from the node B 240 is designated at numeral 227 and a signal received by the node A 230 is designated at numeral 228.

It is important for the present example that the asymmetric Y branch optical waveguide according to the invention of the present application is used to distribute the received light to the receiver sides as large light signals. In the asymmetric Y branch optical waveguide according to the invention of the present application, a large branching ratio unused so far can be realized with a low radiation loss. From this point of view, the asymmetric Y branch optical waveguide according to the invention of the present application is extremely useful for the construction of such an optical system. Optical communication power can be reduced sufficiently low for safety purpose by setting the branching ratio of the asymmetric Y branch optical waveguide 211 to increase toward the receiver side, whereby an optical communication system having satisfactory received sensitivity can be constructed.

Figure 13:
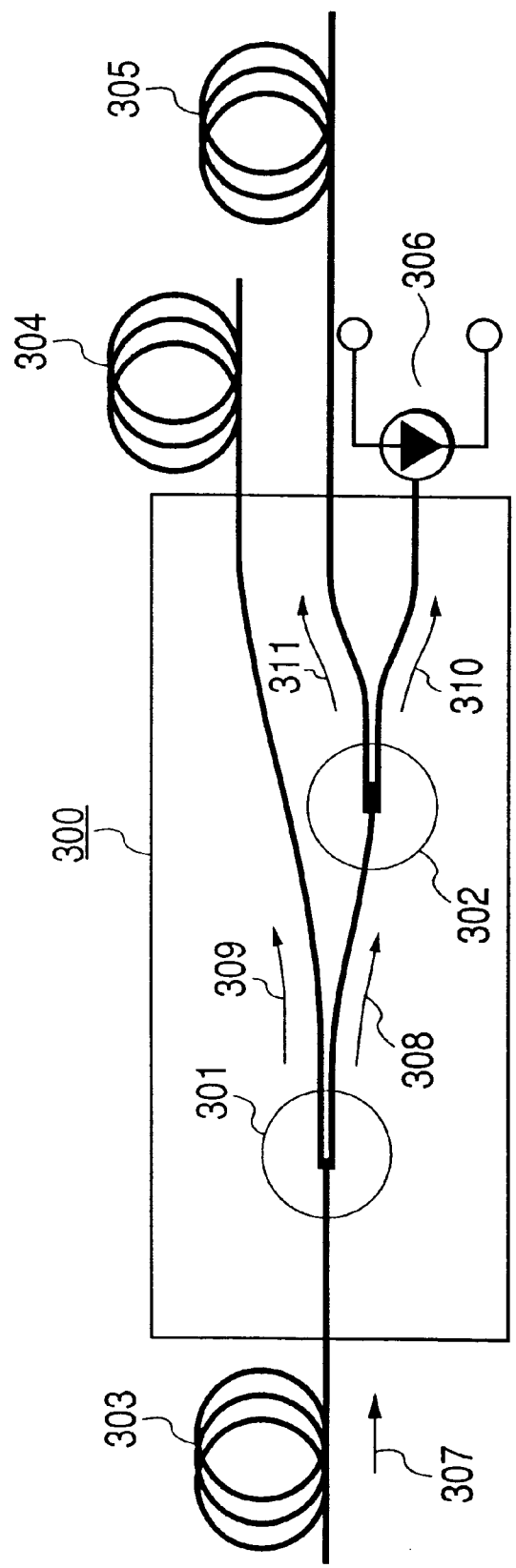
FIG. 13 is a view depicting an example of an optical system using a lightwave circuit according to the invention of the present application.

FIG. 13 shows an example of an optical transmission system to which the lightwave circuit 300 shown in FIG. 10 is applied. A first branch part 301 is an asymmetric Y branch optical waveguide according to the invention of the present application. A second branch part 302 is a usual symmetric Y branch optical waveguide.

A light signal 307 emitted from a semiconductor laser device is inputted to the first branch side of this optical branching circuit as a first optical signal. Further, a second light signal 310 of light signal 308 from the first branch part 301, which is branched off by the second branch part 302 is constructed so as to be received by a light-receptive device 306, e.g., a photodiode. On the other hand, optical fibers 304 and 305 are connected to other respective optical waveguides, and the first and second respective light signals 309 and 311 are constructed so as to propagate through their corresponding optical fibers.

What is claimed is:

1. A Y branch optical waveguide, comprising:
   a first optical waveguide;
   two second optical waveguides; and
   a multi-mode optical waveguide connected between said first optical waveguide and said two second optical waveguides; wherein
   the width of said first optical waveguide and the width of said multi-mode optical waveguide are different in a direction orthogonal to an extension of an optical axis at a portion where said first optical waveguide and said multi-mode optical waveguide are connected to each other, and
   said multi-mode optical waveguide has shapes asymmetric with respect to an extension of a center line, extending in the direction of the optical axis, of said first optical waveguide so that propagation light has an asymmetric optical intensity distribution at a portion where said multi-mode optical waveguide and second optical waveguides are connected when light is incident from said first optical waveguide, and said optical intensity distribution has a first peak and a second peak different in light intensity from each other and each of said peaks is located at near a center of each of said second optical waveguides at portions where said multi-mode optical waveguide and said second optical waveguides are connected, respectively.

2. The Y branch optical waveguide according to claim 1, wherein exit portions of said multi-mode optical waveguide are constructed so as to be symmetric with respect to the extension of the center line, extending in the direction of the optical axis, of said first optical waveguide and said second optical waveguides are constructed so as to be symmetric with respect to the extension of said center line.

3. The Y branch optical waveguide according to claim 2, wherein the width of one of entrance portions of said multi-mode optical waveguide, which are divided by the extension of the center line, extending in the direction of the optical axis, of said first optical waveguide is smaller than that of its corresponding exit portion of said multi-mode optical waveguide.

4. The Y branch optical waveguide according to claim 1, wherein the width of one of entrance portions of said multi-mode optical waveguide, which are divided by the extension of the center line, extending in the direction of the optical axis, of said first optical waveguide is smaller than that of its corresponding exit portion of said multi-mode optical waveguide.

5. The Y branch optical waveguide according to claim 1, wherein the width of one of intermediate portions of said multi-mode optical waveguide, which are divided by the center line, is smaller than that of its corresponding exit portion of said multi-mode optical waveguide.

6. The Y branch optical waveguide according to claim 5, wherein the exit portions of said multi-mode optical waveguide are constructed so as to be symmetric with respect to the extension of the center line, extending in the direction of the optical axis, of said first optical waveguide.

7. The Y branch optical waveguide according to claim 1, wherein the distances between sides of core portions of said multi-mode optical waveguide and the extension of the center line, extending in the direction of the optical axis, of said first optical waveguide are formed so as to differ from each other at at least a portion with respect to the traveling direction of the light.

8. The Y branch optical waveguide according to claim 7, wherein the distance between at least one side of the core portion of said multi-mode optical waveguide and the center line is formed so as to change into a form curved with respect to the traveling direction of the light.

9. The Y branch optical waveguide according to claim 7, wherein a variation in the distance between one side of the core portion of said multi-mode optical waveguide and the extension of the center line, extending in the direction of the optical axis, of said first optical waveguide is constructed so as to be gentler than the extent of a variation at other than the neighborhood of each exit of said multi-mode optical waveguide in the vicinity of the exit of said multi-mode optical waveguide.

10. The Y branch optical waveguide according to claim 7, wherein the distance between one side of the core portion of the multi-mode optical waveguide and the extension of the center line, extending in the direction of the optical axis, of said first optical waveguide increases from an entrance to its corresponding exit, and the variation in the distance is formed so as to decrease in the vicinity of the entrance and each exit of said multi-mode optical waveguide as compared with each intermediate portion of said multi-mode optical waveguide.

11. The Y branch optical waveguide according to claim 7, wherein offsets each having a predetermined width are provided at their corresponding entrances of said two second optical waveguides.

12. The Y branch optical waveguide according to claim 1, wherein at least a side of a core region of a connecting portion between said first optical waveguide and said multi-mode optical waveguide has a transition region, and extensions of both sides of a core region of said first optical waveguide and a core region of said multi-mode optical waveguide, both being connected to both sides of said transition region, intersect each other.

13. The Y branch optical waveguide according to claim 12, wherein extensions of both sides of a core region of said first optical waveguide and a core region of said multi-mode optical waveguide, both being connected to both sides of said transition region, are orthogonal to each other.

14. The Y branch optical waveguide according to claim 13, wherein the exit portions of the multi-mode optical waveguide are constructed so as to be symmetric with respect to the extension of the center line, extending in the direction of the optical axis, of said first optical waveguide.

15. The Y branch optical waveguide according to claim 13, wherein the distances between sides of core portions of said multi-mode optical waveguide and the extension of the center line, extending in the direction of the optical axis, of said first optical waveguide are formed so as to differ from each other at at least a portion with respect to the traveling direction of the light.

16. The Y branch optical waveguide according to claim 12, wherein the exit portions of said multi-mode optical waveguide are constructed so as to be symmetric with respect to the extension of the center line, extending in the direction of the optical axis, of said first optical waveguide.

17. The Y branch optical waveguide according to claim 12, wherein the distances between sides of core portions of said multi-mode optical waveguide and the extension of the center line, extending in the direction of the optical axis, of said first optical waveguide are formed so as to differ from each other at at least a portion with respect to the traveling direction of the light.

18. The Y branch optical waveguide according to claim 1, wherein a discontinuous portion of the connecting portion between said first optical waveguide and said multi-mode optical waveguide is formed such that the width of said first optical waveguide, extending in the direction intersecting with the extension of the optical axis varies over a length of less than or equal to 50 times, comparing to the wavelength in the optical waveguide of light propagated through the corresponding optical waveguide.

19. The Y branch optical waveguide according to claim 18, wherein the exit portions of said multi-mode optical waveguide are constructed so as to be symmetric with respect to the extension of the center line, extending in the direction of the optical axis, of said first optical waveguide.

20. The Y branch optical waveguide according to claim 18, wherein the distances between sides of core portions of said multi-mode optical waveguide and the extension of the center line, extending in the direction of the optical axis, of said first optical waveguide are formed so as to differ from each other at at least a portion with respect to the traveling direction of the light.

21. A Y branch optical waveguide, comprising:
    a first optical waveguide;

two second optical waveguides; and a multi-mode optical waveguide connected between said first optical waveguide and said two second optical waveguides; wherein the width of said first optical waveguide extending in the direction orthogonal to an extension of an optical axis has discontinuity at a portion where said first optical waveguide and said multi-mode optical waveguide are connected to each other, and said multi-mode optical waveguide has shapes asymmetric with respect to an extension of a center line, extending in the direction of the optical axis of said first optical waveguide so that propagation light has a first peak and a second peak different in light intensity from each other in association with each of said two second optical waveguides when the light is incident from said first optical waveguide, and the distance between one side of the core portion of said multi-mode optical waveguide and the extension of the center line, extending in the direction of the optical axis, of said first optical waveguide is formed so as to increase in sine function form from the entrance to its corresponding exit.

22. The Y branch optical waveguide comprising:

a first optical waveguide;

two second optical waveguides; and a multi-mode optical waveguide connected between said first optical waveguide and said two second optical waveguides; wherein the width of said first optical waveguide, extending in the direction orthogonal to an extension of an optical axis has discontinuity at a portion where said first optical waveguide and said multi-mode optical waveguide are connected to each other, and said multi-mode optical waveguide has shapes asymmetric with respect to an extension of a center line, extending in the direction of the optical axis, of said first optical waveguide so that propagation light has a first peak and a second peak different in light intensity from each other in association with each of said two second optical waveguides when the light is incident from said first optical waveguide, and the distance between one side of the core portion of said multi-mode optical waveguide and the extension of the center line, extending in the direction of the optical axis, of said first optical waveguide is formed so as to increase in Raised Sin form from the entrance to its corresponding exit.

23. A Y branch optical waveguide, comprising:

a first optical waveguide;

two second optical waveguides; and a multi-mode optical waveguide disposed between said first optical waveguide and said two second optical waveguides;

wherein in the width of said first optical waveguide and the width of said multi-mode optical waveguide are different in the direction orthogonal to an extension of an optical axis at a portion where said first optical waveguide and said multi-mode optical waveguide are connected to each other, and said multi-mode optical waveguide has shapes formed asymmetrically with respect to the extension of the center line, extending in the direction of the optical axis, of said first optical waveguide so that distributions of light intensities at a surface intersecting an optical axis of propagation light perpendicular thereto have two maximum values different in light intensity from each other when the light is incident from said first optical waveguide and each of said two maximum values of light intensity are located at near a center of each of said second optical waveguides at portions where said multi-mode optical waveguide and said second optical waveguides are connected, respectively.

* * * * *